United States Patent
Inoue et al.

(10) Patent No.: US 10,340,804 B2
(45) Date of Patent: Jul. 2, 2019

(54) POWER SUPPLY CIRCUIT INCLUDING CONVERTER AND POWER SUPPLY SYSTEM USING THE SAME

(71) Applicant: KABUSHIKI KAISHA TOYOTA CHUO KENKYUSHO, Nagakute-shi, Aichi-ken (JP)

(72) Inventors: Shuntaro Inoue, Nagakute (JP); Kenichi Takagi, Nagakute (JP); Takahide Sugiyama, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/808,550

(22) Filed: Nov. 9, 2017

(65) Prior Publication Data
US 2018/0131281 A1   May 10, 2018

(30) Foreign Application Priority Data
Nov. 10, 2016 (JP) .................................. 2016-219679

(51) Int. Cl.
| | | |
|---|---|---|
| H02M 3/00 | (2006.01) | |
| H02M 3/28 | (2006.01) | |
| H02J 1/10 | (2006.01) | |
| H02M 1/34 | (2007.01) | |
| H02M 1/40 | (2007.01) | |

(Continued)

(52) U.S. Cl.
CPC ............. *H02M 3/285* (2013.01); *H02J 1/102* (2013.01); *H02M 1/34* (2013.01); *H02M 1/40* (2013.01); *H02M 3/005* (2013.01); *H02M 3/33561* (2013.01); *H02M 3/33576* (2013.01); *H02M 2001/009* (2013.01);
(Continued)

(58) Field of Classification Search
None
See application file for complete search history.

(56) References Cited

U.S. PATENT DOCUMENTS

| | | | |
|---|---|---|---|
| 2014/0254203 A1* | 9/2014 | Dai | ..................... H02M 3/3353 363/17 |
| 2015/0295502 A1 | 10/2015 | Hirano | |
| 2017/0085189 A1* | 3/2017 | Madsen | ............ H02M 3/33546 |

FOREIGN PATENT DOCUMENTS

| | | |
|---|---|---|
| JP | 2007-159177 A | 6/2007 |
| JP | 2011-109815 A | 6/2011 |

(Continued)

OTHER PUBLICATIONS

Chuanhong Zhao et al. "An Isolated Three-Port Bidirectional DC-DC Converter With Decoupled Power Flow Management", IEEE Trans. Power Electron., vol. 23, No. 5, pp. 2443-2453, Sep. 2008.

*Primary Examiner* — Jue Zhang
*Assistant Examiner* — Henry E Lee, III
(74) *Attorney, Agent, or Firm* — Oliff PLC

(57) ABSTRACT

A power supply circuit includes inductors, capacitors, and switching elements. Ports are electrically insulated from each other. Two switching elements are alternately switched, and two other switching elements are alternately switched. The inductors are wound such that a magnetic flux is generated in the same direction when a phase difference between the switchings of the switching elements is zero. Duties of the switchings of the switching elements are changed equally, and a phase difference between the switchings is changed.

13 Claims, 19 Drawing Sheets

(51) Int. Cl.
   *H02M 3/335*   (2006.01)
   *H02M 1/00*    (2006.01)
(52) U.S. Cl.
   CPC ............... *H02M 2001/0064* (2013.01); *H02M 2001/342* (2013.01); *Y02B 70/1491* (2013.01)

(56) References Cited

FOREIGN PATENT DOCUMENTS

| | | |
|---|---|---|
| JP | 2014-171310 A | 9/2014 |
| JP | 2015-202001 A | 11/2015 |

* cited by examiner

300

200

POWER SUPPLY CIRCUIT INCLUDING CONVERTER AND POWER SUPPLY SYSTEM USING THE SAME

CROSS REFERENCE TO RELATED APPLICATION

The entire disclosure of Japanese Patent Application No. 2016-219679 filed on Nov. 10, 2016, including the specification, claims, drawings, and abstract, is incorporated herein by reference in its entirety.

TECHNICAL FIELD

The present disclosure relates to a power supply circuit including a converter, and to a power supply system which uses the power supply circuit.

BACKGROUND

Recently, with development of electric motorization of automobiles or the like, on many occasions, a plurality of converters are used for supplying electric power from a plurality of power supplies to various loads such as a motor, an auxiliary machine, or the like.

FIG. 14 is a diagram showing an example structure of a power supply system 100 in a hybrid electric vehicle. The power supply system 100 includes a main power supply 102, a first sub power supply 104, and a second sub power supply 106, which have different output voltages from each other. The main power supply 102, the first sub power supply 104, and the second sub power supply 106 are, for example, power supplies which output voltages of 600 V, 12 V, and 48 V, respectively. The output voltages of the main power supply 102, the first sub power supply 104, and the second sub power supply 106 are DC-to-DC converted by converters 108A~108D, and are applied to loads such as a motor 110, an auxiliary machine 112, a charger 114, a plug output 116, a large-power auxiliary machine 118, or the like.

With introduction of automatically driven vehicle or the like, it is desired to ensure redundancy by duplexing a vehicle system, targeting stable travel, safe travel, or the like. FIG. 15 is a diagram showing an example structure of a power supply system 150 in which the system is duplexed. The power supply system 150 includes main power supplies 152a and 152b, a first sub power supply 154, and a second sub power supply 156. Output voltages of the main power supplies 152a and 152b, and the first sub power supply 154 are DC-to-DC converted by converters 158A and 158B. Further, output voltages of the main power supplies 152a and 152b, and the second sub power supply 156 are DC-to-DC converted by converters 158D and 158E. The output voltages of the main power supplies 152a and 152b, the first sub power supply 154, and the second sub power supply 156 are DC-to-DC converted and applied to loads such as motors 160a and 160b, an auxiliary machine 162, a charger 164, a large-power auxiliary machine 166, or the like. In this manner, it is possible to duplex the main power supplies 152a and 152b, the motors 160a and 160b (including peripheral devices such as inverters for connecting these components), the converters 158A and 158B, and the converters 158D and 158E.

FIG. 16 is a diagram showing an example structure of a power supply system 170 in which two inverters are electrically insulated from each other. In the power supply system 170, because the two inverters are electrically insulated from each other, even when one of the inverters fails, the power supply system can be maintained by the remaining inverter. In addition, even when one of the main power supplies 152a and 152b fails, the power supply system can be maintained by the remaining main power supply. Further, even when one of the converters 158A and 158B or one of the converters 158D and 158E connecting the main power supplies 152a and 152b, and the first sub power supply 154 or the second sub power supply 156 fails, the power supply system can be maintained.

FIG. 17 shows a structure of a voltage converter 200 of related art having 3 input/output ports. In the voltage converter 200 of the related art, as shown in FIG. 18, switches S1~S6 are switched such that an L1 voltage, an L2 voltage, and an L3 voltage which are voltages between respective ends of windings L1, L2, and L3, respectively, change with different phases from each other, so as to control an L1 current, an L2 current, and an L3 current flowing in the windings L1, L2, and L3, respectively. With such a configuration, the transfer electric power can be controlled between the port 1, the port 2, and the port 3.

With progress of electric motorization of the system such as the vehicle, the number of the converters of the insulating type is increased. In addition, when ensuring redundancy by duplexing the system is required, the number of the converters must be further increased. Therefore, a technique for reducing the number of the converters is desired.

Moreover, in a structure of the voltage converter 200 of the related art, a phase is caused between ports for which phases are not desired. For example, when the phase is to be controlled with only the ports 1 and 2, a phase is caused not only between the windings L1 and L2, but also between the windings L2 and L3. Therefore, although a trapezoidal current is to be generated as the L1 current and the L2 current as shown in FIG. 18, the L3 current is also caused through the winding L3. Because the L3 current is hard-switched with turn-off at a peak current value, the efficiency in the converter is reduced.

For example, when ports 1~3 are set at voltages of 100 V, 48 V, and 12 V, respectively, and a converter is designed with 1.5 kW and a maximum phase of 30°, there is a possibility of causing, at transfer of 375 W, a turn-off loss of about two times a steady state. In this process, as shown in FIG. 19, there is a possibility that the value of L3 current is increased to about two times at the time of the hard-switching, due to a current ripple.

SUMMARY

According to one aspect of the present disclosure, there is provided a power supply circuit comprising: a first converter circuit that includes a first capacitor, a second capacitor, a third capacitor, a first inductor, a second inductor, a first switching element, and a second switching element, and in which a first port and a second port are provided; and a second converter circuit that includes a fourth capacitor, a fifth capacitor, a sixth capacitor, a third inductor, a fourth inductor, a third switching element, and a fourth switching element, and in which a third port is provided, wherein the first converter circuit and the second converter circuit are electrically insulated from each other, the first switching element and the second switching element are alternately switched, and the third switching element and the fourth switching element are alternately switched, the first inductor and the second inductor, and the third inductor and the fourth inductor are respectively magnetically coupled to each other by a common magnetic core, and are wound in directions to generate a magnetic flux in a same direction with each other in the magnetic core when a phase difference between the switching of the first converter circuit and the switching of the second converter circuit is zero, and duties of the switching between the first switching element and the second switching element and the switching between the third switching element and the fourth switching element are changed equally, and a phase difference between the switchings is changed.

According to another aspect of the present disclosure, there is provided a power supply circuit comprising: a first converter circuit that includes a first capacitor, a second capacitor, a first inductor, a first transformer winding, and a first switching element, and in which a first port is provided; a second converter circuit that includes a third capacitor, a fourth capacitor, a second inductor, a second transformer winding, and a second switching element, and in which a second port is provided; and a third converter circuit that includes a fifth capacitor, a sixth capacitor, a seventh capacitor, a third inductor, a fourth inductor, a third switching element, and a fourth switching element, and in which a third port is provided, wherein the first converter circuit, the second converter circuit, and the third converter circuit are electrically insulated from each other, the first switching element and the second switching element are alternately switched, and the third switching element and the fourth switching element are alternately switched, the first inductor, the second inductor, the third inductor, and the fourth inductor are magnetically coupled to each other by a common first magnetic core, and the first transformer winding and the second transformer winding are magnetically coupled to each other by a common second magnetic core, and are wound in directions to generate a magnetic flux in the same direction with each other in the first magnetic core when a phase difference between switching between the first switching element and the second switching element, and switching between the third switching element and the fourth switching element is zero, and duties of the switching between the first switching element and the second switching element, and the switching between the third switching element and the fourth switching element are changed equally, and a phase difference between the switchings is changed.

BRIEF DESCRIPTION OF DRAWINGS

Embodiment(s) of the present disclosure will be described by reference to the following figures, wherein.

DESCRIPTION OF EMBODIMENTS

[Basic Structure]

Figure 1:
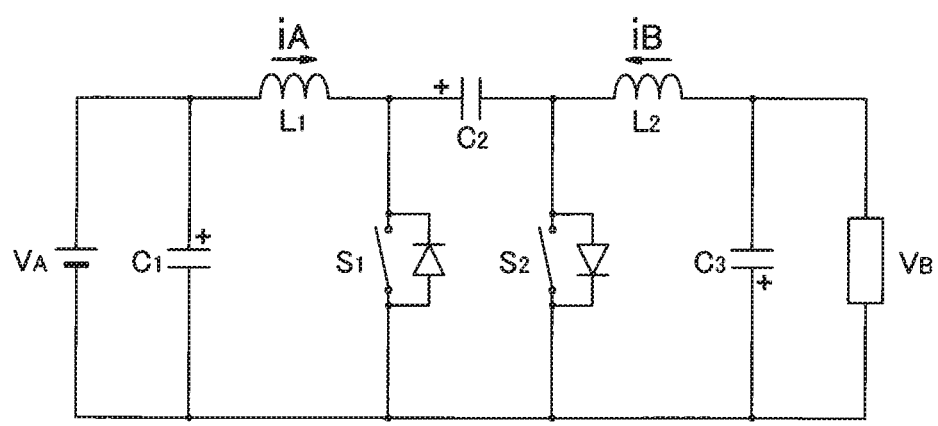
FIG. 1 is a diagram showing a basic circuit of a converter according to an embodiment of the present disclosure.

A power supply system according to an embodiment of the present disclosure is formed using a basic circuit 300 of a converter shown in FIG. 1. The basic circuit 300 of the converter comprises a power supply $V_A$, capacitors C1, C2, and C3, inductors L1 and L2, and switching elements S1 and S2. The basic circuit 300 receives the power supply $V_A$ as an input voltage, and controls a voltage $V_B$ of an output port.

Figure 2:
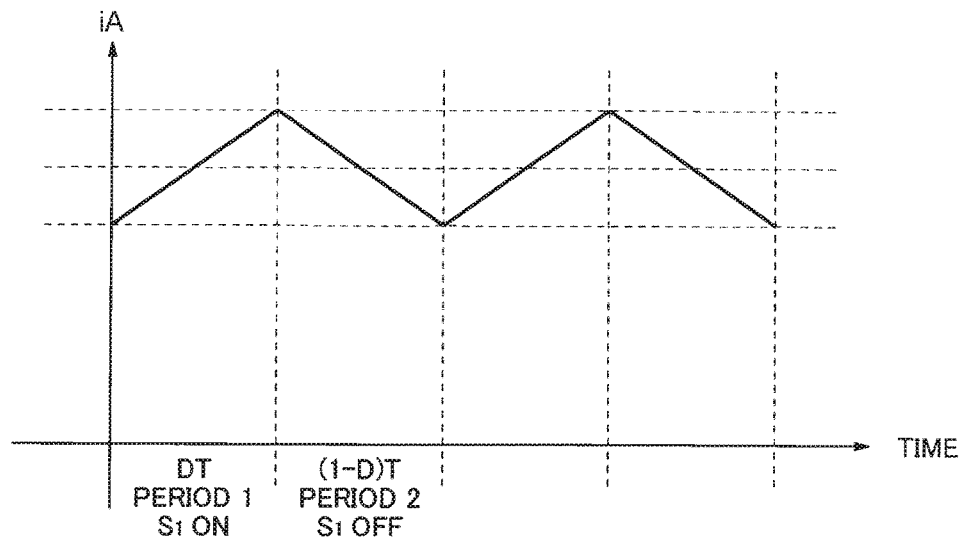
FIG. 2 is a diagram showing an operation of a basic circuit of a converter according to an embodiment of the present disclosure.
Figure 2:
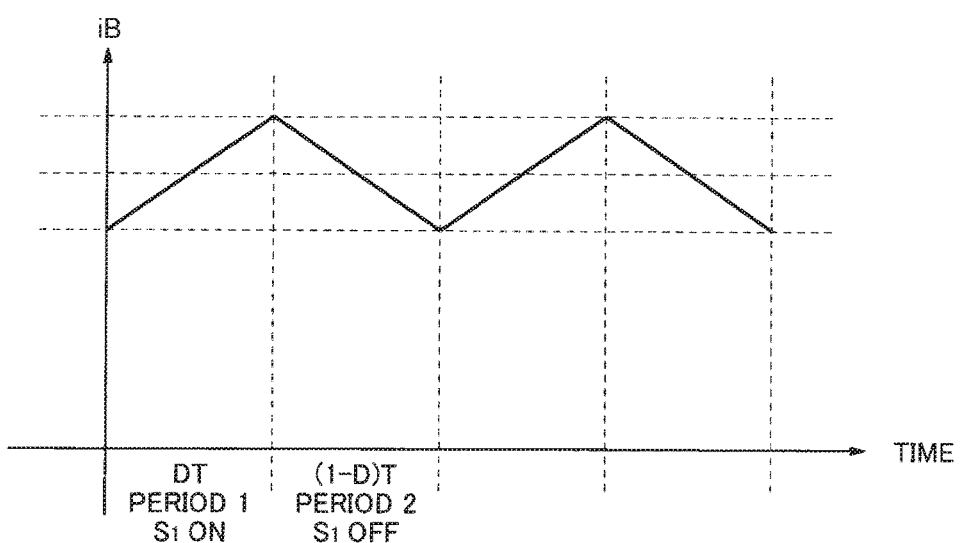
Figure 3:
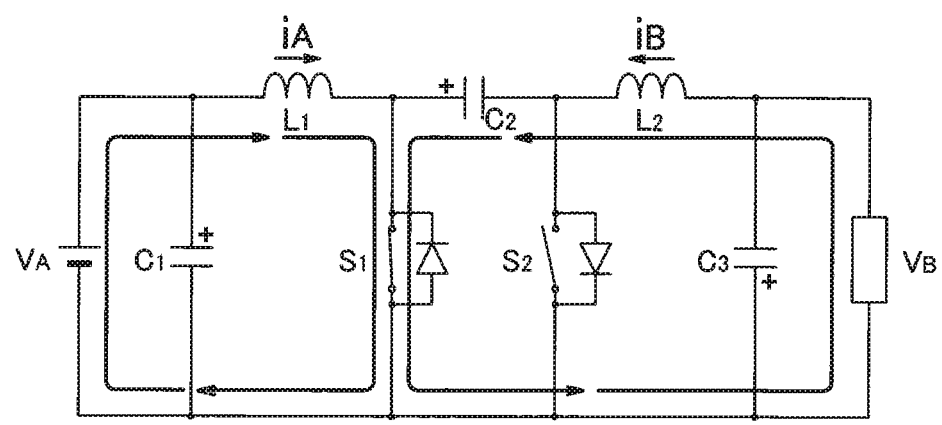
FIG. 3 is a diagram showing one state of a basic circuit of a converter according to an embodiment of the present disclosure.
Figure 4:
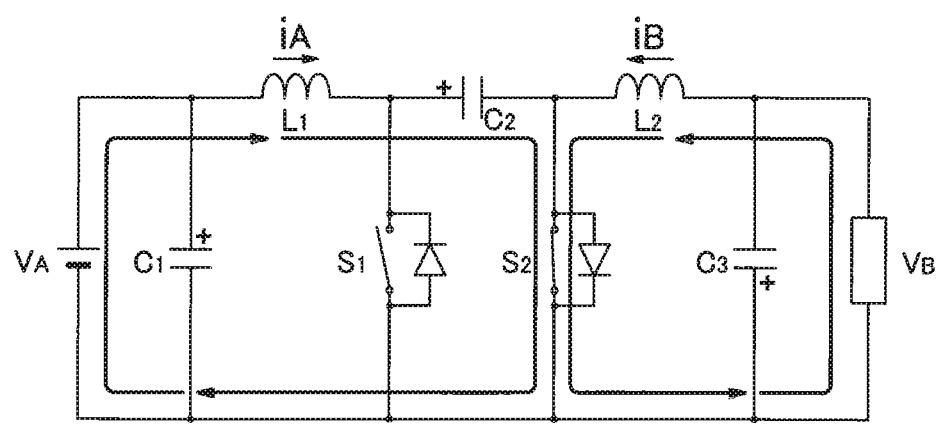
FIG. 4 is a diagram showing another state of the basic circuit of the converter according to an embodiment of the present disclosure.

FIG. 2 is a diagram showing changes with respect to time of a current $i_A$ flowing in the inductor L1 of the basic circuit 300, and those of a current $i_B$ flowing in the inductor L2. FIG. 3 shows a state of the basic circuit 300 of a first period in which the switching element S1 is switched ON and the switching element S2 is switched OFF. In the first period in which the switching element S1 is switched ON and the switching element S2 is switched OFF, as shown in FIG. 3, a charging current flows from the voltage $V_B$ of the output port to the capacitor C2. FIG. 4 shows a state of the basic circuit 300 in a second period in which the switching element S1 is switched OFF and the switching element S2 is switched ON. In the second period in which the switching element S1 is switched OFF and the switching element S2 is switched ON, as shown in FIG. 4, a charging current flows from the power supply $V_A$ to the capacitor C2. In the basic circuit 300, a duty between the first period and the second period is controlled, to enable application of positive and negative voltages to the inductors L1 and L2 by the capacitor C2. With such a configuration, in the basic circuit 300, the voltage $V_B$ of the output port can be controlled.

[First Embodiment]

Figure 5:
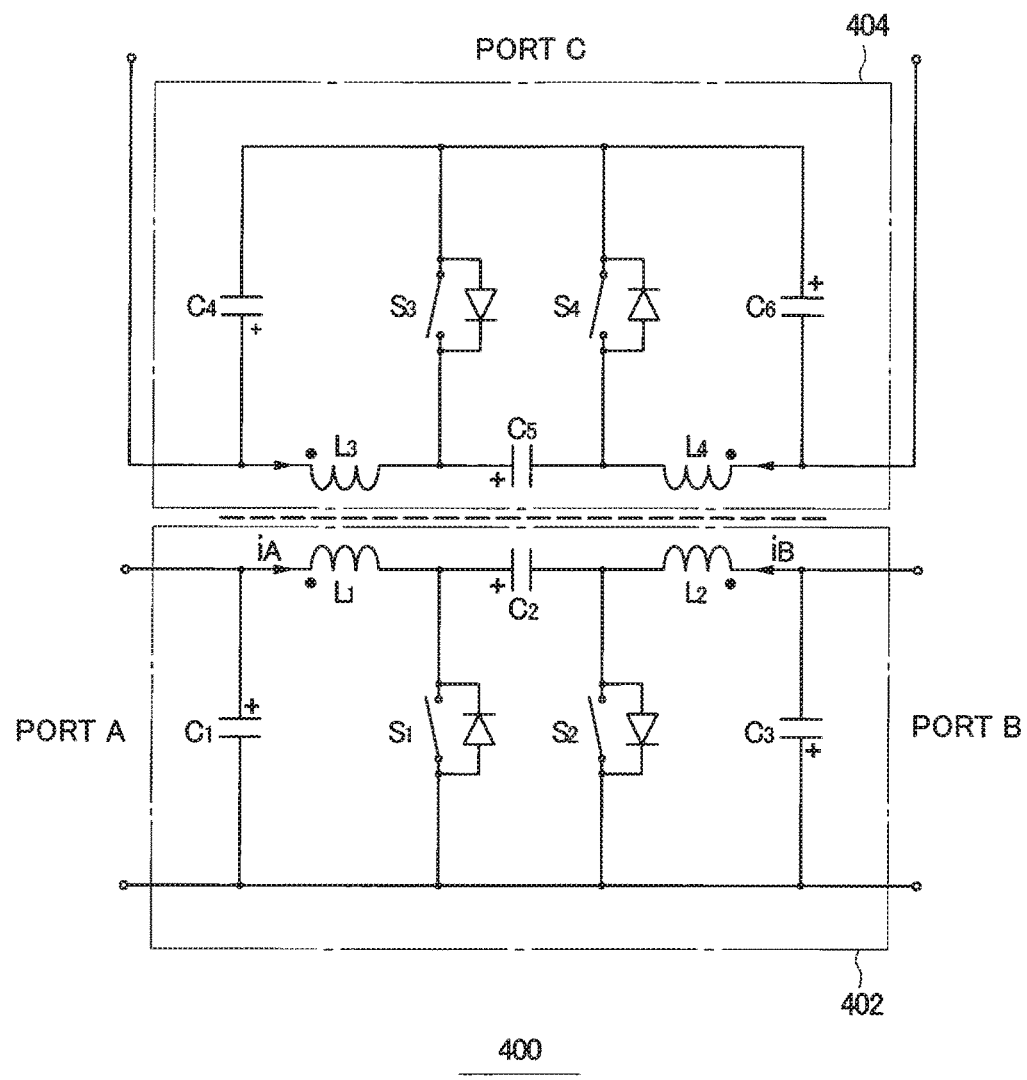
FIG. 5 is a diagram showing a structure of a converter according to a first embodiment of the present disclosure.

FIG. 5 shows a structure of a converter 400 according to a first embodiment of the present disclosure. The converter 400 comprises capacitors C1~C6, inductors L1~L4, and switching elements S1~S4.

The converter 400 is formed by combining a basic circuit 402 of a primary side including the capacitors C1~C3, the inductors L1 and L2, and the switching elements S1 and S2, and a basic circuit 404 of a secondary side including the capacitors C4~C6, the inductors L3 and L4, and the switching elements S3 and S4. In the basic circuit 402, a port A and a port B are provided. In the basic circuit 404, a port C is provided. Voltages $V_A$, $V_B$, and $V_C$ which differ from each other are output from the port A, the port B, and the port C, respectively.

The basic circuit 402 has the following structure. At respective terminals of the port A, the capacitor C1 is connected. The inductor L1 and the switching element S1 are connected in series, and the series connection is connected in parallel with the capacitor C1. Similarly, at respective ends of the port B, the capacitor C3 is connected, the inductor L2 and the switching element S2 are connected in series, and the series connection is connected in parallel with the capacitor C3. A connection point between the inductor L1 and the switching element S1 and a connection point between the inductor L2 and the switching element S2 are connected by the capacitor C2. Further, a connection point between the capacitor C1 and the switching element S1 and a connection point between the capacitor C3 and the switching element S2 are short-circuited. In the basic circuit 402, the switching element S1 and the switching element S2 are exclusively and alternately switched.

In the basic circuit 404, similar to the basic circuit 402, the capacitors C4~C6, the inductors L3 and L4, and the switching elements S3 and S4 are connected in a manner similar to that of the capacitors C1~C3, the inductors L1 and L2, and the switching elements S1 and S2, respectively. The port C extends from a connection point between the capacitor C4 and the inductor L3 and a connection point between the capacitor C6 and the inductor L4. In the basic circuit 404, the switching element S3 and the switching element S4 are exclusively and alternately switched. Further, a duty of switching in the basic circuit 404 is basically set equal to the duty of switching in the basic circuit 402.

The inductor L1 and the inductor L3 are electromagnetically coupled to each other, and the inductor L2 and the inductor L4 are electromagnetically coupled to each other. With such a configuration, the primary side in which the port A and the port B are provided and the secondary side in which the port C is provided are electromagnetically coupled to each other. Desirably, the inductors L1~L4 are coupled by one magnetic core. Further, the inductors L1~L4 are wound in directions to generate a magnetic flux in the same direction with each other in the magnetic core when a phase difference between the switching of the switching element S1 and the switching element S2 and the switching between the switching element S3 and the switching element S4 is zero.

The converter 400 has a structure in which the voltage of the port C is not affected when the duty is changed with respect to a change of a voltage ratio between the port A and the port B.

Figure 6:
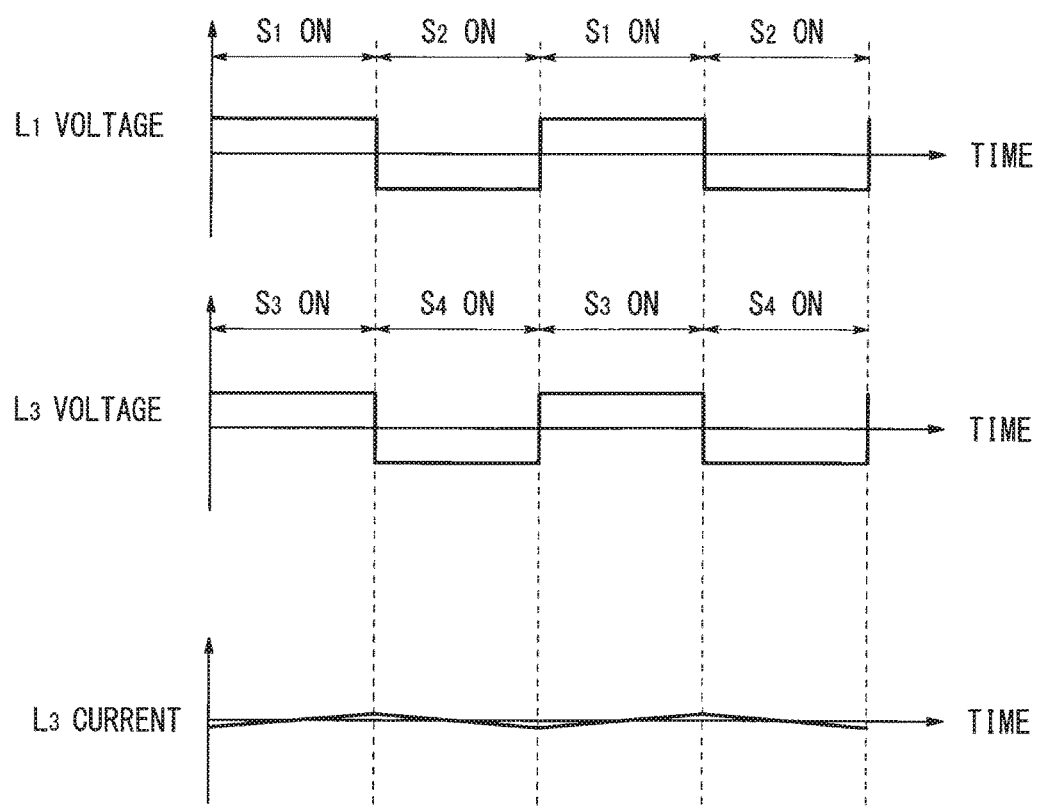
FIG. 6 is a diagram showing a change of a current at each control state of the converter according to the first embodiment of the present disclosure.

FIG. 6 shows a change of an L3 current flowing in the inductor L3 when switchings of the switching elements S1~S4 are controlled to change an L1 voltage between terminals of the inductor L1 and an L3 voltage between terminals of the inductor L3 in the same phase. When the L1 voltage between the terminals of the inductor L1 and the L3 voltage between the terminals of the inductor L3 are changed in the same phase, the L3 current progresses s at approximately 0.

Figure 7:
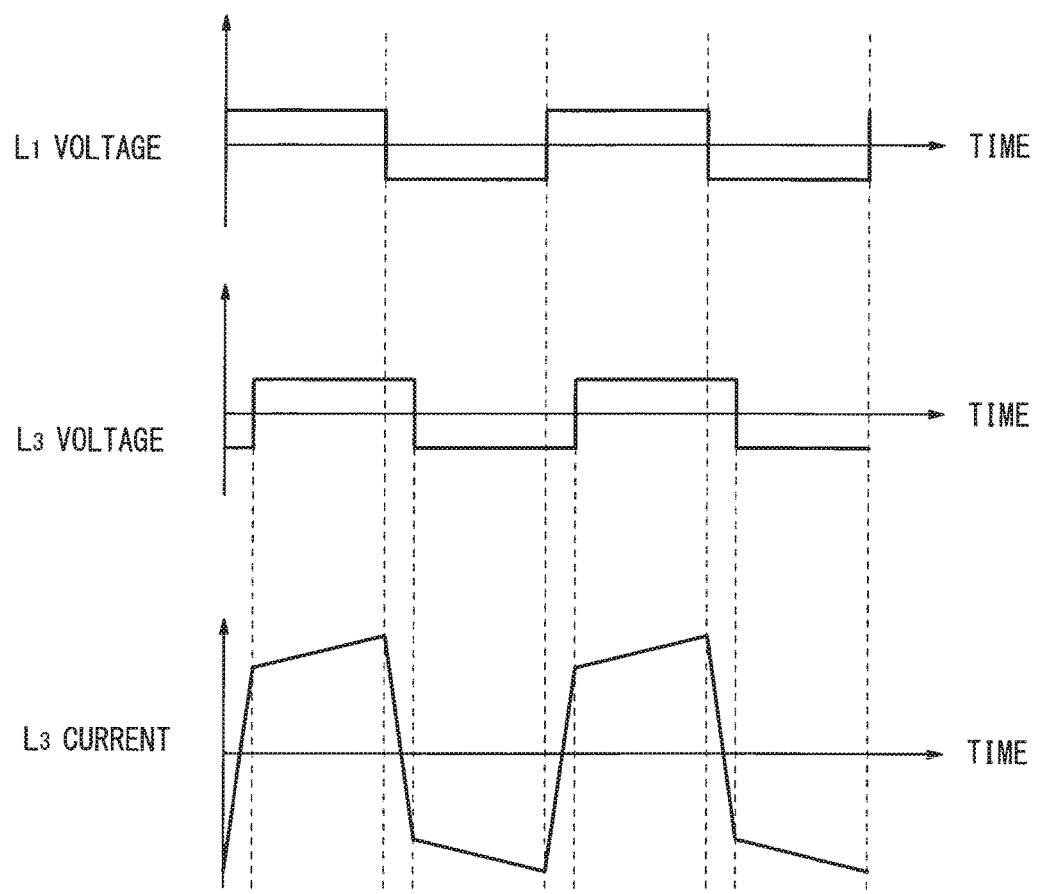
FIG. 7 is a diagram showing a change of a current at each control state of the converter according to the first embodiment of the present disclosure.

FIG. 7 shows a change of the L3 current flowing in the inductor L3 when the switchings of the switching elements S1~S4 are controlled so that the phase of the L1 voltage between the terminals of the inductor L1 is advanced compared to the phase of the L3 voltage between the terminals of the inductor L3. In this case, because the inductor L1 and the inductor L3 are electromagnetically coupled to each other, the L3 current becomes a trapezoidal current.

By setting a phase difference in the switchings between the primary side basic circuit 402 and the secondary side basic circuit 404, it becomes possible to transfer electric power from the port A and the port B to the port C. In this process, by simultaneously changing the duty of the switchings, it becomes possible to transfer electric power also from the port A to the port B. Here, by adjusting the phase and duty of the switchings such that the electric power transferred from the port B to the port C and the electric power transferred from the port A to the port B are equal to each other, it becomes possible to set the electric power extracted from the port B to zero, and to consequently transfer the electric power only from the port A to the port C.

In this manner, by combining two basic circuits 402 and 404, it becomes possible to control, independently from each other, the voltages $V_A$, $V_B$, and $V_C$ which are output from the port A, the port B, and the port C, by the duties and the phases of the voltages of the inductors L1~L4.

[First Alternative Configuration]

Figure 8:
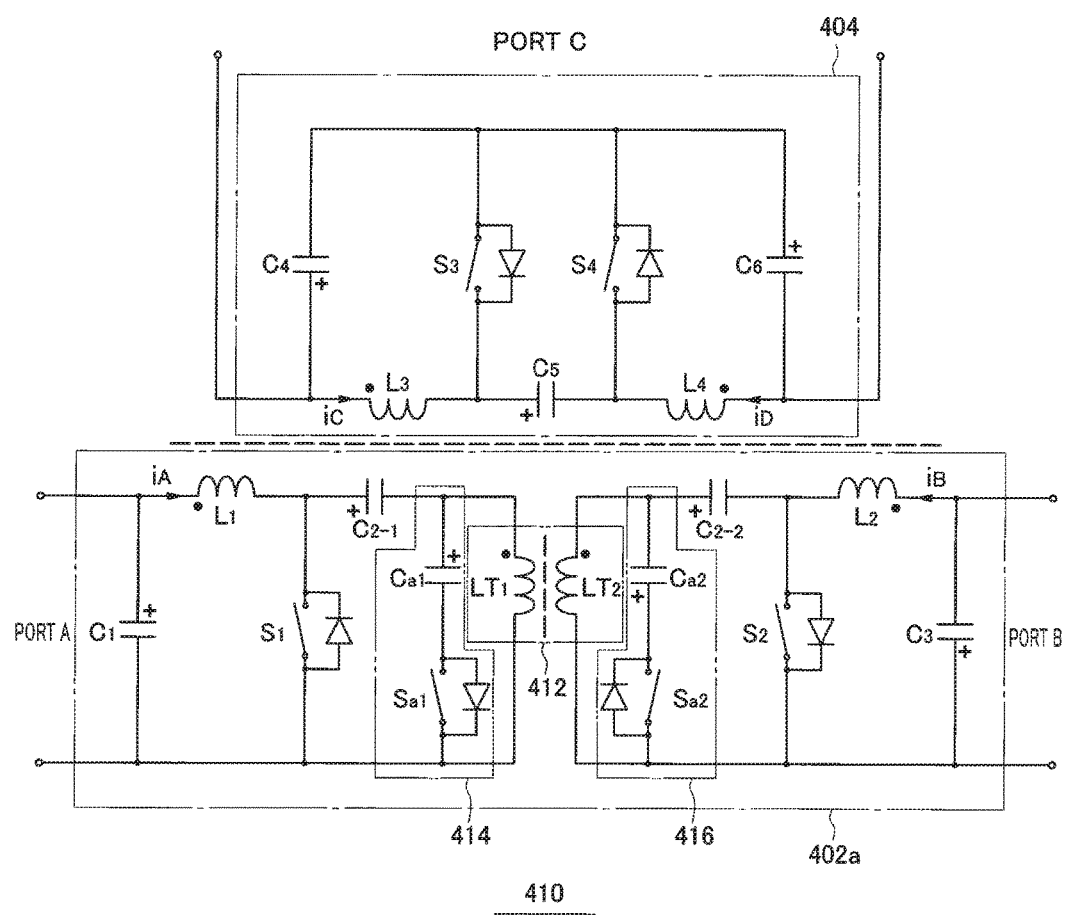
FIG. 8 is a diagram showing a structure of a first alternative configuration of a converter according to the first embodiment of the present disclosure.

FIG. 8 shows a structure of a converter 410 which is an alternative configuration of the converter 400. In the converter 410, a transformer winding LT1 and an auxiliary circuit 414 are provided on a side of the port A, and a transformer winding LT2 and an auxiliary circuit 416 are provided on a side of the port B, so that the circuit on the side of the port A and the circuit on the side of the port B are electromagnetically coupled to each other through a transformer 412. The auxiliary circuits 414 and 416 form a snubber circuit, and are provided respectively for returning the charges accumulated in capacitors Ca1 and Ca2 to the transfer electric power by switching elements Sa1 and Sa2.

In this manner, by providing the transformer 412 between the port A and the port B, it is possible to achieve a state in which the port A and the port B are electrically insulated from each other.

[Second Alternative Configuration]

Figure 9:
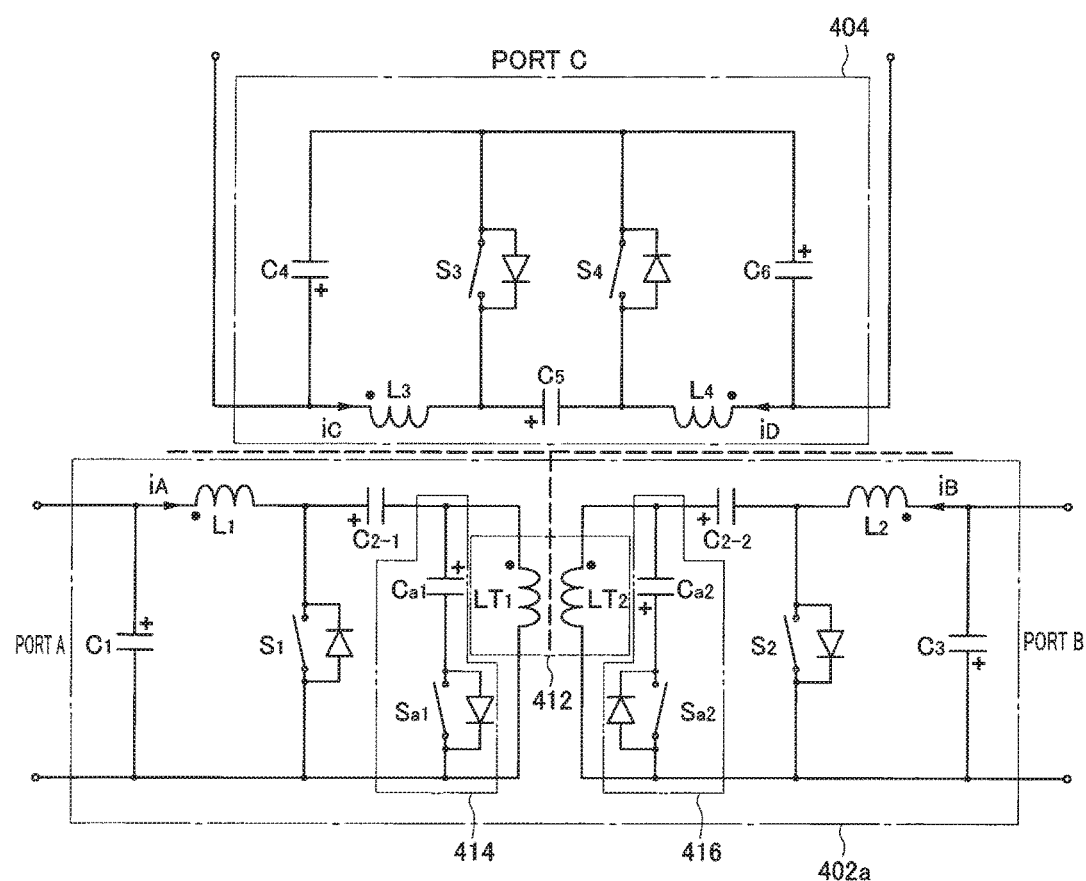
FIG. 9 is a diagram showing a structure of a second alternative configuration of a converter according to the first embodiment of the present disclosure.

FIG. 9 shows a structure of a converter 420 which is an alternative configuration of the converter 410. In the converter 420, a structure is employed in which the magnetic circuits of the inductor L1 and the inductor L3, the inductor L2 and the inductor L4, and the transformer winding LT1 and the transformer winding LT2 are integrated. By integrating the magnetic circuits in this manner, the number of cores can be reduced.

In addition, an efficiency of the converter 420 can be improved as compared with the converter of the related art. In addition, as described above, by integrating the magnetic circuits, the number of the cores can be reduced. Further, hard-switching at the peak current value can be avoided.

[Other Alternative Configurations]

Next, alternative configurations of the present disclosure will be described with reference to FIGS. 10~12. The alternative configurations shown in FIGS. 10~12 are example structures in which three ports (ports A~C) are electrically insulated from each other.

Figure 10:
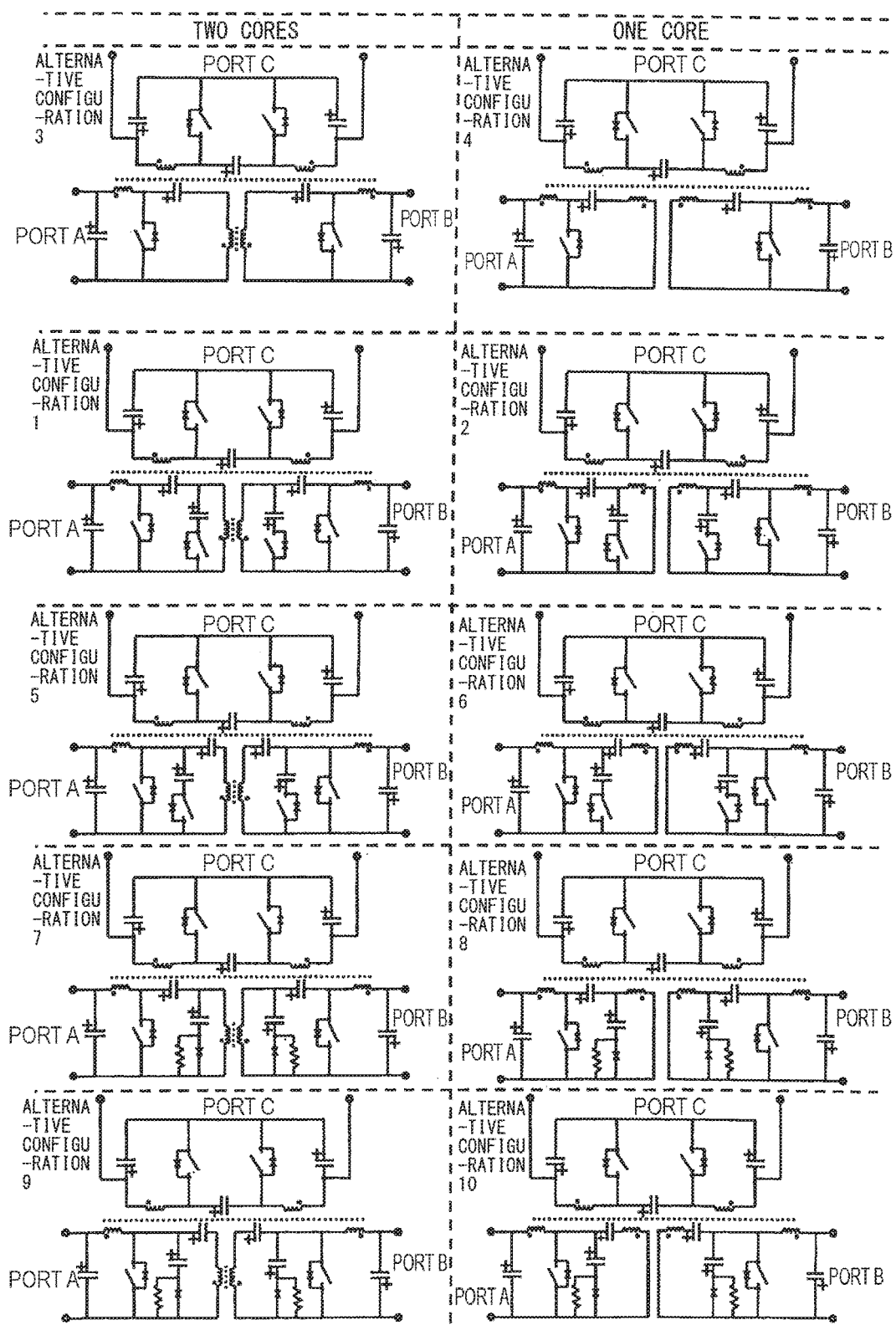
FIG. 10 is a diagram showing an alternative configuration of a converter according to an embodiment of the present disclosure.

A left column and a right column of FIG. 10 show alternative configurations in which the number of cores of the magnetic circuits is set to 2 and 1, respectively. A third alternative configuration and a fourth alternative configuration shown at a top-most row of FIG. 10 show structures in which the snubber circuit for a leakage inductance of the transformer added between the port A and the port B is not provided. The first alternatively configuration and the second alternative configuration shown on a second row of FIG. 10 show structures as described above, in which the snubber circuit for the leakage inductance of the transformer added between the port A and the port B is provided. A fifth alternative configuration and a sixth alternative configuration shown on a third row of FIG. 10 show other structures in which the snubber circuit for the leakage inductance of the transformer added between the port A and the port B is provided. A seventh alternative configuration and an eighth alternative configuration shown on a fourth row of FIG. 10 show structures in which a resistance-consumption type snubber circuit is provided. A ninth alternative configuration and a tenth alternative configuration shown on a fifth row of FIG. 10 show other structures in which the resistance-consumption type snubber circuit is provided.

Figure 11:
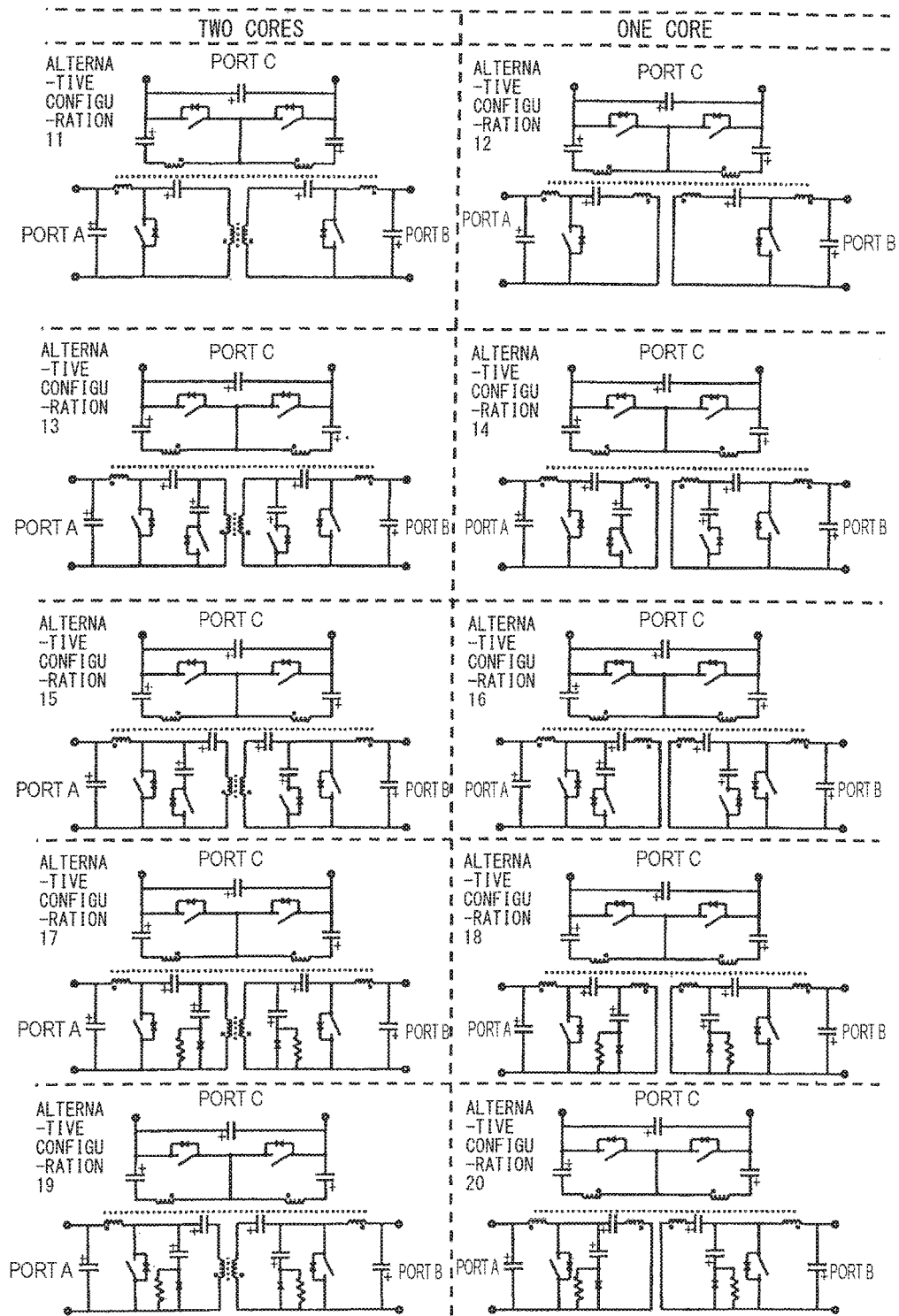
FIG. 11 is a diagram showing an alternative configuration of a converter according to an embodiment of the present disclosure.
Figure 12:
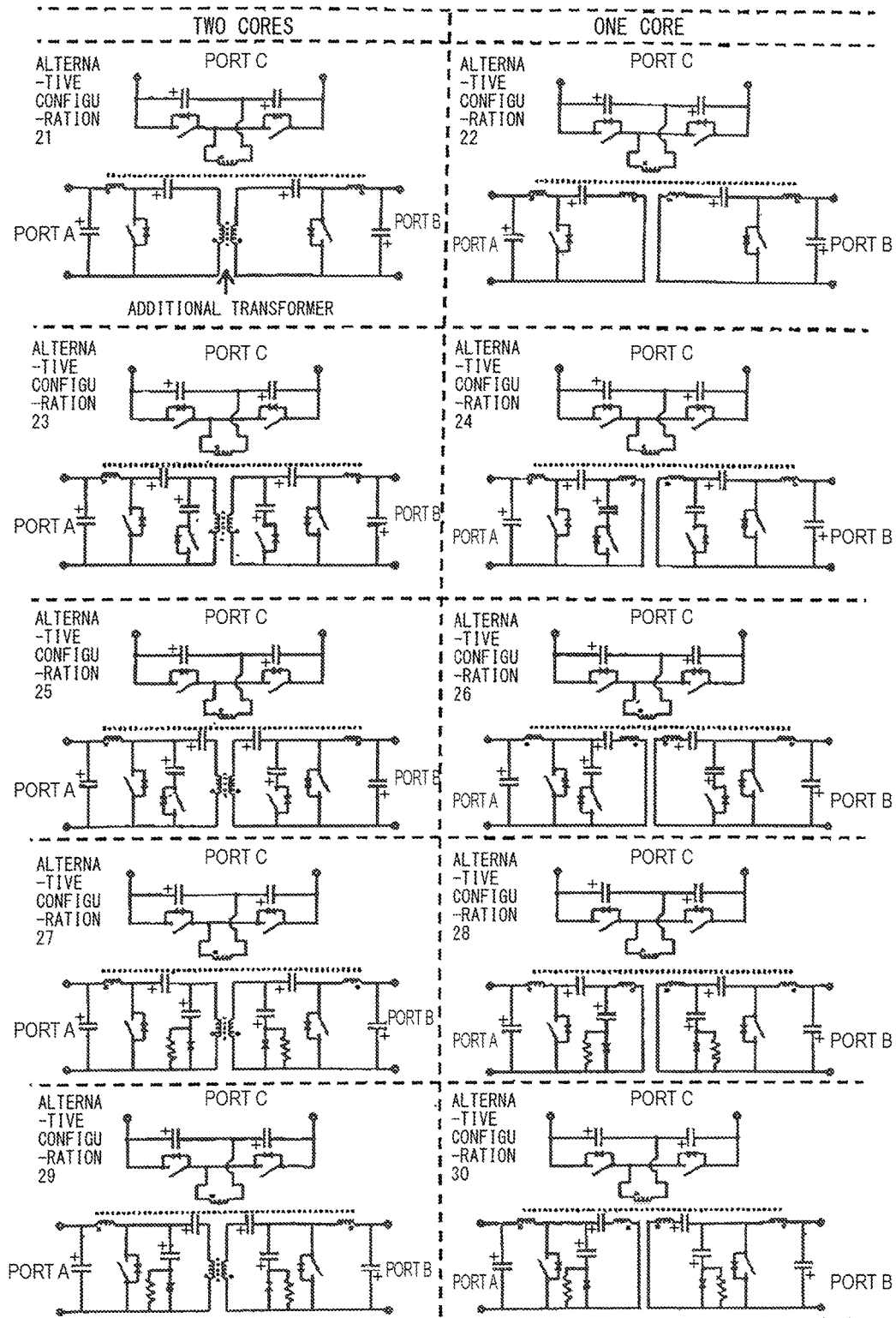
FIG. 12 is a diagram showing an alternative configuration of a converter according to an embodiment of the present disclosure.

A left column and a right column of FIG. 11 show alternative configurations in which the number of the cores of the magnetic circuit is set to 2 and 1, respectively. Alternative configurations of FIG. 11 have structures in which the circuit on the side of the port C is changed. Specifically, the port C is formed between a connection point between the capacitor C4 and the switching element S3, and a connection point between the capacitor C6 and the switching element S4 in the basic circuit 404 shown in FIG. 5, and the capacitor C5 is connected between the connection points.

An eleventh alternative configuration and a twelfth alternative configuration shown at a top-most row of FIG. 11 show structures in which the snubber circuit for the leakage inductance of the transformer added between the port A and the port B is not provided. A thirteenth alternative configuration and a fourteenth alternative configuration shown on a second row of FIG. 11 show structures in which the snubber circuit for the leakage inductance of the transformer added between the port A and the port B is provided. A fifteenth alternative configuration and a sixteenth alternative configuration shown on a third row of FIG. 11 show other structures in which the snubber circuit for the leakage inductance of the transformer added between the port A and the port B is provided. A seventeenth alternative configuration and an eighteenth alternative configuration shown on a fourth row of FIG. 11 show structures in which a resistance-consumption type snubber circuit is provided. A nineteenth alternative configuration and a twentieth alternative configuration shown on a fifth row of FIG. 11 show other structures in which the resistance-consumption type snubber circuit is provided.

A left column and a right column of FIG. 12 show alternative configurations in which the number of the cores of the magnetic circuit is set to 2 and 1, respectively. The alternative configurations of FIG. 12 are configurations where the circuits on the side of the port C are modified. Specifically, the port C is formed between a connection point between the capacitor C4 and the switching element S3 and a connection point between the capacitor C6 and the switching element S4 in the basic circuit 404 shown in FIG. 5, and an inductor is connected between a connection point between the capacitor C4 and the capacitor C6, and a connection point between the switching element S3 and the switching element S4. In other words, in the alternative configurations of FIG. 12, the side of the port C is formed in a half-bridge structure.

A twenty-first alternative configuration and a twenty-second alternative configuration shown on a top-most row of FIG. 12 show structures in which a snubber circuit for the leakage inductance of the transformer added between the port A and the port B is not provided. A twenty-third alternative configuration and a twenty-fourth alternative configuration shown on a second row of FIG. 12 show structures in which the snubber circuit for the leakage inductance of the transformer added between the port A and the port B is provided. A twenty-fifth alternative configuration and a twenty-sixth alternative configuration shown on a third row of FIG. 12 show other structures in which the snubber circuit for the leakage inductance of the transformer added between the port A and the port B is provided. A twenty-seventh alternative configuration and a twenty-eighth alternative configuration shown on a fourth row of FIG. 12 show structures in which a resistance-consumption type snubber circuit is provided. A twenty-ninth alternative configuration and a thirtieth alternative configuration shown on a fifth row of FIG. 12 show other structures in which the resistance-consumption type snubber circuit is provided.

[System Structure]

Figure 13:
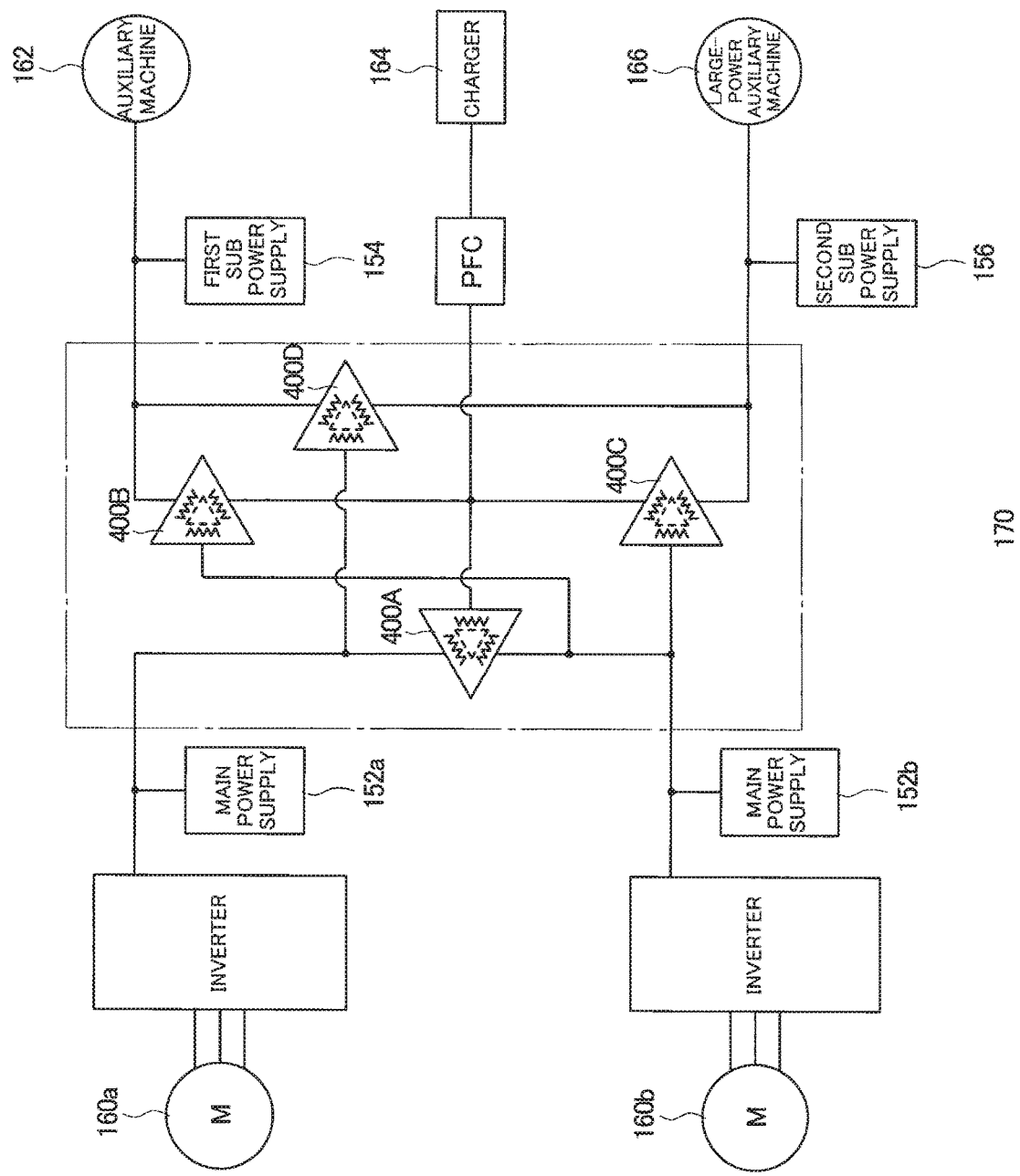
FIG. 13 is a diagram showing a structure of a power supply system according to an embodiment of the present disclosure.
Figure 14:
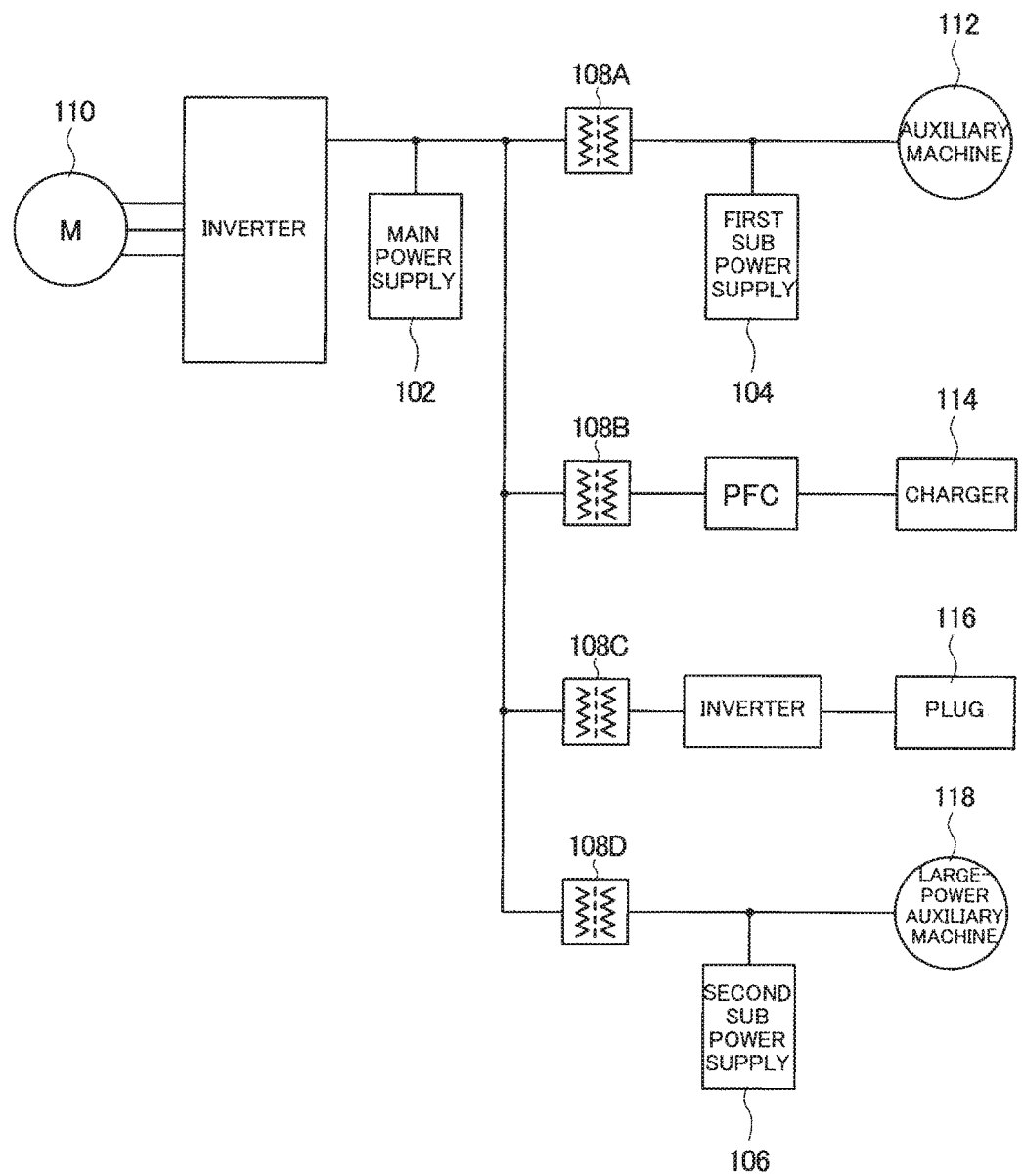
FIG. 14 is a diagram showing a structure of a power supply system according to a related art.
Figure 15:
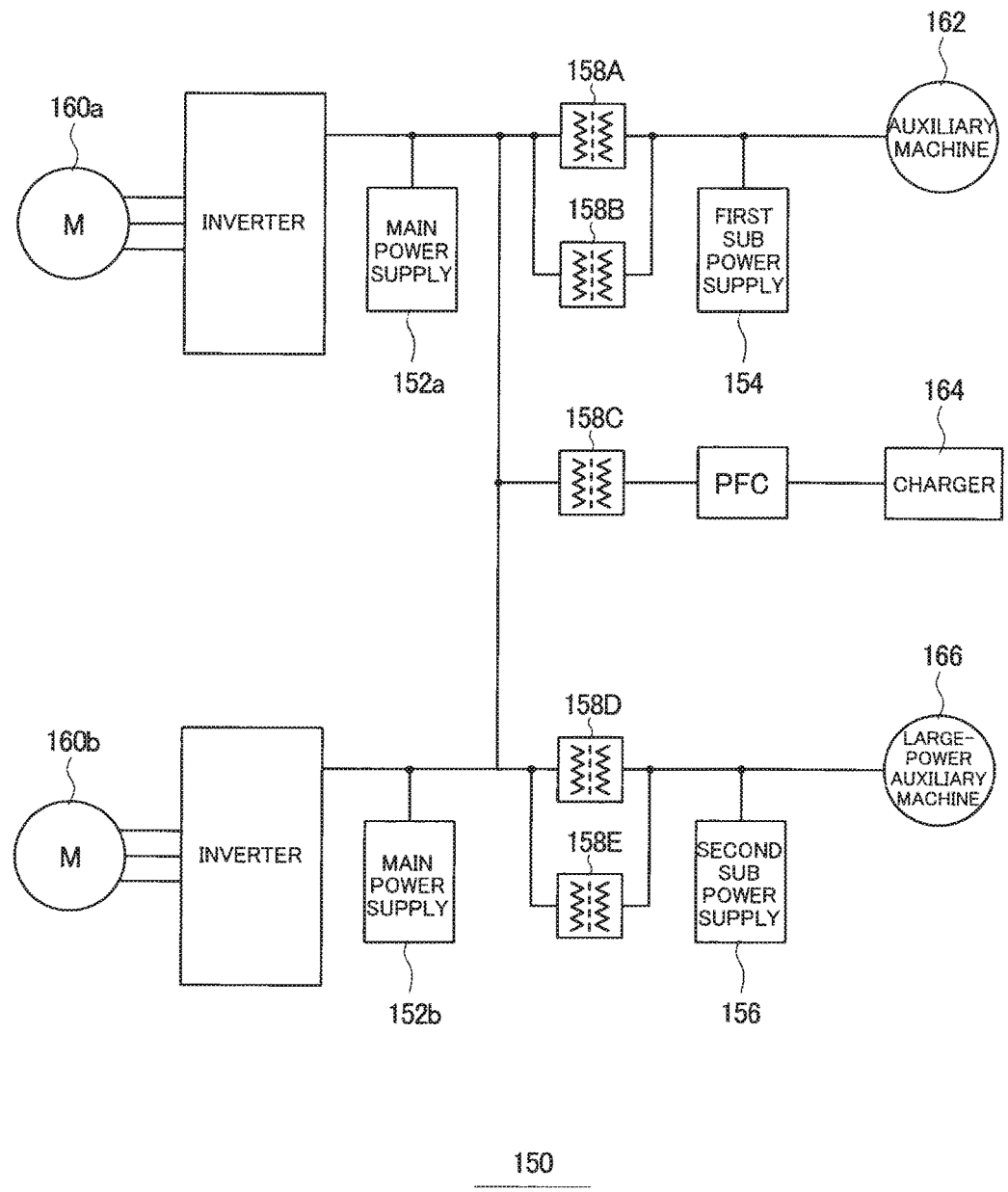
FIG. 15 is a diagram showing an example structure of a duplexed power supply system according to a related art.
Figure 16:
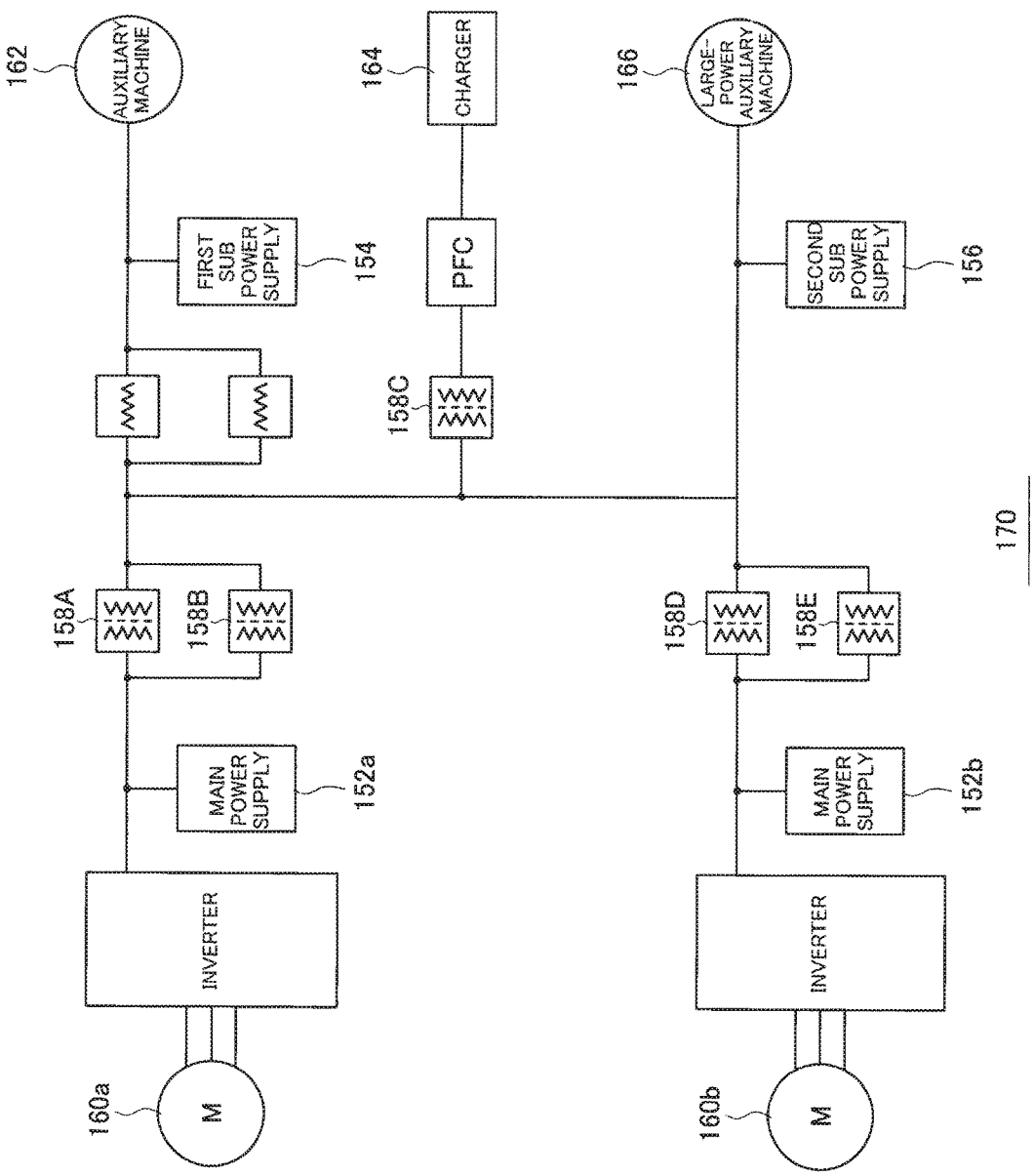
FIG. 16 is a diagram showing another example structure of a duplexed power supply system according to a related art.
Figure 17:
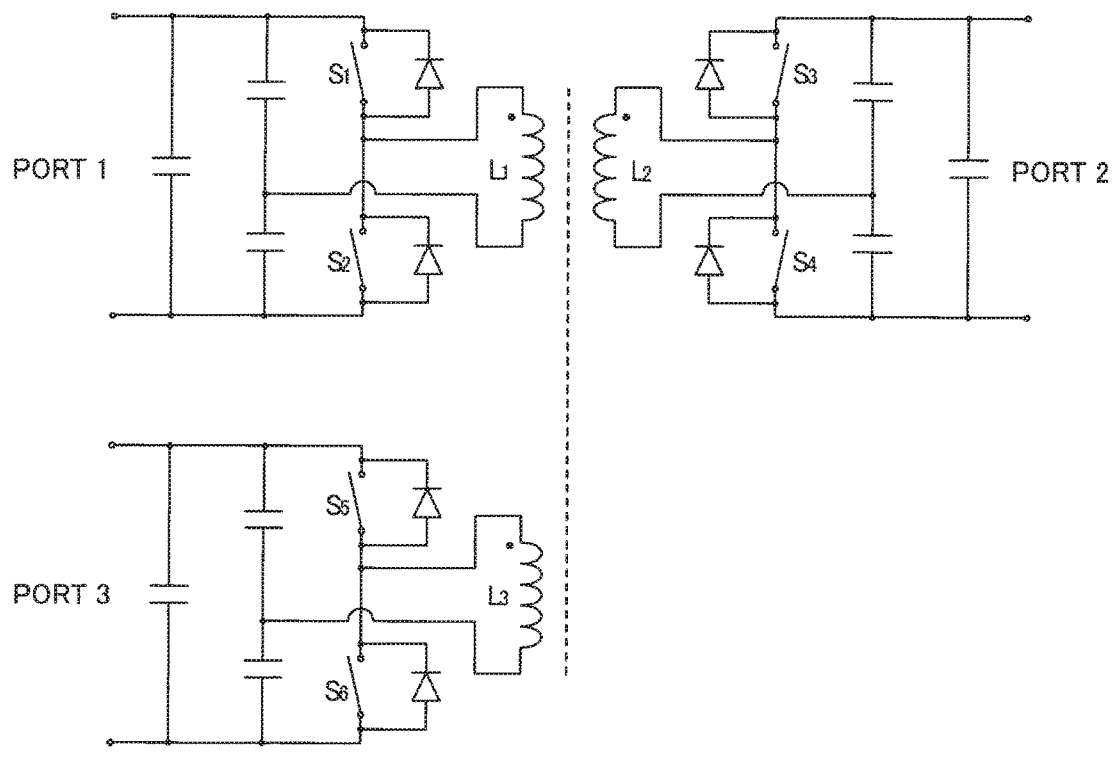
FIG. 17 is a diagram showing a structure of a 3-port type converter of a related art.
Figure 18:
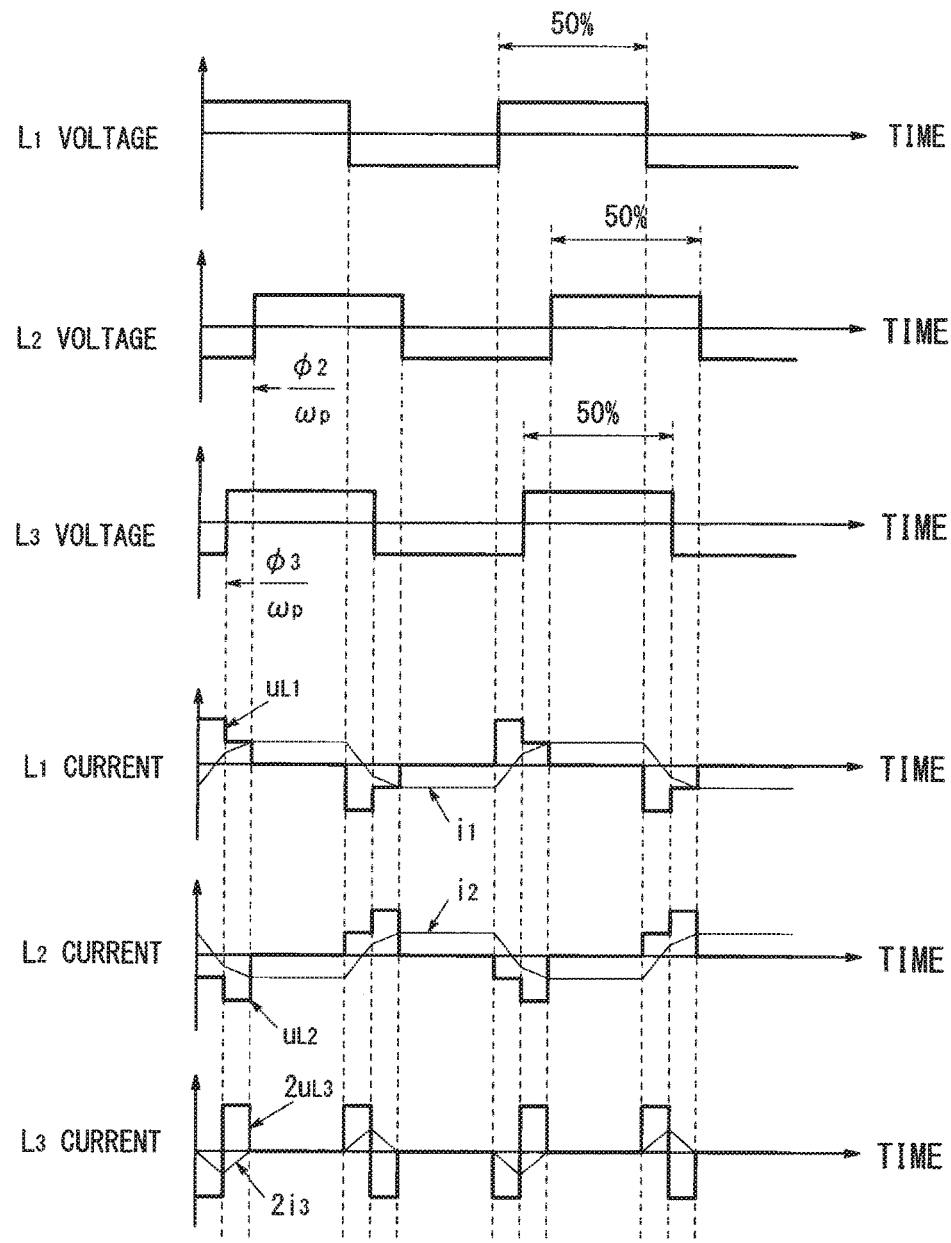
FIG. 18 is a diagram showing a change of a current during control of a converter of a related art.
Figure 19:
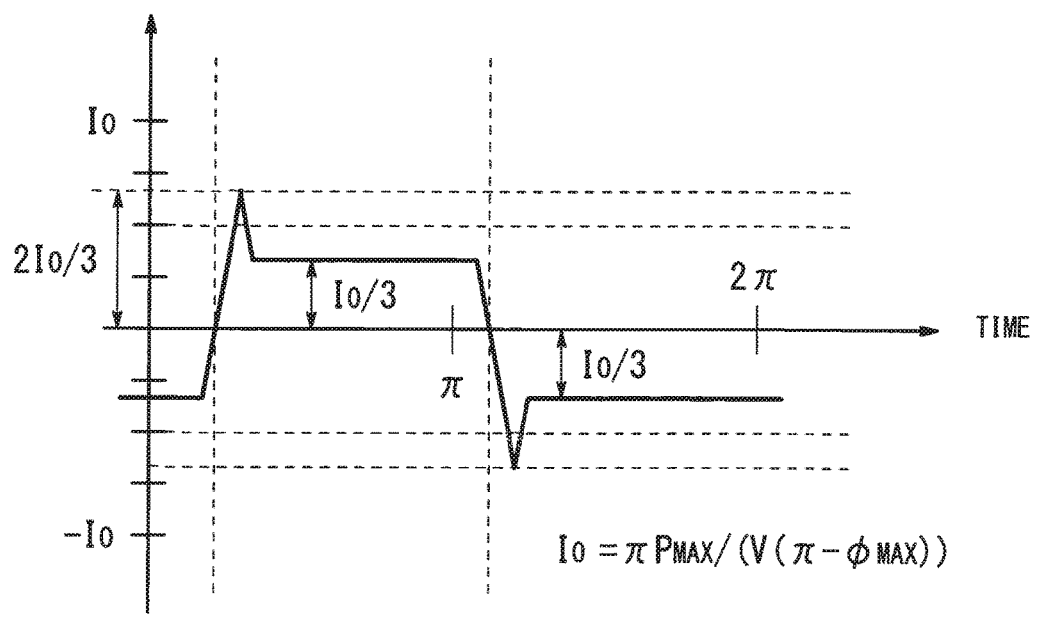
FIG. 19 is a diagram for explaining a generation state of a current ripple in a converter of a related art.
Figure 19:
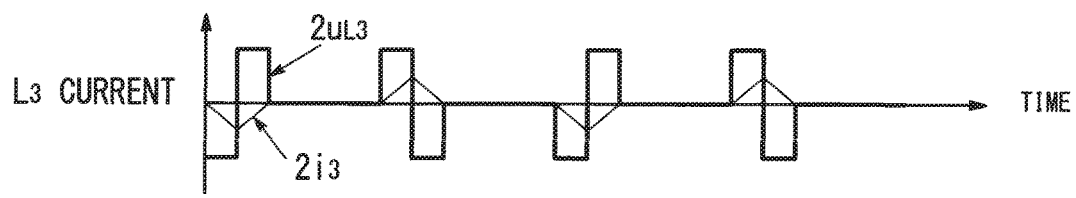

FIG. 13 shows an example structure of a power supply system which uses the converter 400 according to the embodiment of the present disclosure. FIG. 13 shows an example configuration where the power supply system 170 of the related art shown in FIG. 16 is formed using the 3-port type converters 400 (400A~400D).

As shown in FIG. 13, by connecting the main power supplies 152a and 152b, the first sub power supply 154, the second sub power supply 156, the auxiliary machine 162, the charger 164, the large-power auxiliary machine 166, and the like to each other by the 3-port type converters 400, it is possible to reduce the number of the converters 400 which are used.

In this description, an example configuration which uses the converter 400 is described. Alternatively, the alternative configurations of the converters such as the converters 410 and 420 may be applied.

The invention claimed is:

1. A power supply circuit comprising:
   a first converter circuit that includes a first capacitor, a second capacitor, a third capacitor, a first inductor, a second inductor, a first switching element, and a second switching element, and in which a first port and a second port are provided; and
   a second converter circuit that includes a fourth capacitor, a fifth capacitor, a sixth capacitor, a third inductor, a fourth inductor, a third switching element, and a fourth switching element, and in which a third port is provided, wherein
   the first converter circuit and the second converter circuit are electrically insulated from each other;
   the first switching element and the second switching element are alternately switched based on a phase of a first switching of the first converter circuit so that only one of first switching element and the second switching element is switched on during any period of the phase of switching of the first converter, and the third switching element and the fourth switching element are alternately switched based on a phase of a second switching of the second converter so that only one of the third switching element and the fourth switching element is switched on during any period of the phase of switching of the second converter, the first inductor and the second inductor, and the third inductor and the fourth inductor are respectively magnetically connected to each other by a common magnetic core, and are wound in directions to generate a magnetic flux in the same direction with each other in the magnetic core when a phase difference between the phase of the switching of the first converter circuit and the phase of the switching of the second converter circuit is zero, and a change of a duty of the first switching is equal to a change of a duty of the second switching, and a phase difference between the phase of the first switching and the phase of the second switching is adjustable.

2. A power supply circuit comprising:

a first converter circuit that includes a first capacitor, a second capacitor, a first inductor, a first transformer winding, and a first switching element, and in which a first port is provided;

a second converter circuit that includes a third capacitor, a fourth capacitor, a second inductor, a second transformer winding, and a second switching element, and in which a second port is provided; and a third converter circuit that includes a fifth capacitor, a sixth capacitor, a seventh capacitor, a third inductor, a fourth inductor, a third switching element, and a fourth switching element, and in which a third port is provided, wherein the first converter circuit, the second converter circuit, and the third converter circuit are electrically insulated from each other, the first switching element and the second switching element are alternately switched based on a phase of a first switching of the first converter circuit so that only one of first switching element and the second switching element is switched on during any period of the phase of switching of the first converter, and the third switching element and the fourth switching element are alternately switched based on a phase of a second switching of the second converter so that only one of the third switching element and the fourth switching element is switched on during any period of the phase of switching of the second converter, the first inductor, the second inductor, the third inductor, and the fourth inductor are magnetically coupled to each other by a common first magnetic core, and the first transformer winding and the second transformer winding are magnetically coupled to each other by a common second magnetic core, and are wound in directions to generate a magnetic flux in the same direction with each other in the first magnetic core when a phase difference between switching between the phase of the first switching element and the phase of the second switching element, and switching between the phase of the third switching element and the phase of the fourth switching element is zero, and a change of a duty of the first switching is equal to a change of a duty of the second switching, and a phase difference between the phase of the first switching and the phase of the second switching is adjustable.

3. The power supply circuit according to claim 2, wherein the first magnetic core and the second magnetic core are integral.

4. The power supply circuit according to claim 2, wherein a snubber circuit is provided on each of the first transformer winding and the second transformer winding.

5. The power supply circuit according to claim 3, wherein a snubber circuit is provided on each of the first transformer winding and the second transformer winding.

6. A power supply system wherein a plurality of electric circuits each including a power supply are connected to each other via the power supply circuit according to claim 1.

7. A power supply system wherein a plurality of electric circuits each including a power supply are connected to each other via the power supply circuit according to claim 2.

8. A power supply system wherein a plurality of electric circuits each including a power supply are connected to each other via the power supply circuit according to claim 3.

9. A power supply system wherein a plurality of electric circuits each including a power supply are connected to each other via the power supply circuit according to claim 4.

10. A power supply system according to claim 6, wherein connections among the plurality of electric circuits are duplexed via the power supply circuit.

11. A power supply system according to claim 7, wherein connections among the plurality of electric circuits are duplexed via the power supply circuit.

12. A power supply system according to claim 8, wherein connections among the plurality of electric circuits are duplexed via the power supply circuit.

13. The power supply system according to claim 9, wherein
connections among the plurality of electric circuits are duplexed via the power supply circuit.

* * * * *